United States Patent
Uchino et al.

(10) Patent No.: US 10,039,149 B2
(45) Date of Patent: Jul. 31, 2018

(54) USER EQUIPMENT AND UPLINK DATA TRANSMISSION METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 58 days.

(21) Appl. No.: 15/112,510

(22) PCT Filed: Mar. 5, 2015

(86) PCT No.: PCT/JP2015/056474
§ 371 (c)(1),
(2) Date: Jul. 19, 2016

(87) PCT Pub. No.: WO2015/141478
PCT Pub. Date: Sep. 24, 2015

(65) Prior Publication Data
US 2016/0338132 A1  Nov. 17, 2016

(30) Foreign Application Priority Data
Mar. 19, 2014  (JP) .................................. 2014-056820

(51) Int. Cl.
*H04W 76/15*  (2018.01)
*H04W 28/08*  (2009.01)
(Continued)

(52) U.S. Cl.
CPC ........... *H04W 76/15* (2018.02); *H04W 16/14* (2013.01); *H04W 28/08* (2013.01); *H04W 80/02* (2013.01); *H04W 88/06* (2013.01)

(58) Field of Classification Search
CPC ... H04W 76/025; H04W 16/14; H04W 28/08; H04W 80/02; H04W 88/06
(Continued)

(56) References Cited

U.S. PATENT DOCUMENTS

2004/0184437 A1* 9/2004 Lee ........................ H04L 1/1685
370/349
2013/0039208 A1* 2/2013 Jonsson .............. H04L 41/0816
370/252
(Continued)

OTHER PUBLICATIONS

International Search Report issued in PCT/JP2015/056474 dated May 26, 2015 (2 pages).
(Continued)

*Primary Examiner* — Obaidul Huq
(74) *Attorney, Agent, or Firm* — Osha Liang LLP

(57) ABSTRACT

User equipment having a dual connectivity function to communicate with multiple base stations simultaneously, comprising: a PDCP (Packet Data Convergence Protocol) layer processing unit configured to generate packet sequences for transmission to respective ones of the multiple base stations from to-be-transmitted uplink data; and a RLC (Radio Link Control) layer processing unit configured to transmit the generated packet sequences to the multiple base stations. The RLC layer processing unit includes: a RLC buffer configured to store packets transmitted from the PDCP layer processing unit and destined for the respective ones of the multiple base stations; RLC entities provided corresponding to respective ones of the multiple base stations, the RLC entities being configured to transmit the packets stored in the RLC buffer to the corresponding base stations; and a RLC entity control unit configured to control the RLC buffer and the RLC entities. The RLC entity control unit has a RLC discard timer configured to count a staying time of the respective packets stored in the RLC buffer, the
(Continued)

RLC entity control unit discards a staying packet, for which the RLC discard timer has expired, from the RLC buffer, indicates the PDCP layer processing unit to retransmit the staying packet to the RLC buffer as a packet destined for a different base station, and transmits the staying packet retransmitted from the PDCP layer processing unit from a RLC entity corresponding to the different base station.

20 Claims, 5 Drawing Sheets

(51) Int. Cl.
*H04W 80/02* (2009.01)
*H04W 16/14* (2009.01)
*H04W 88/06* (2009.01)

(58) Field of Classification Search
USPC .......................................... 370/310, 328, 329
See application file for complete search history.

(56) References Cited

U.S. PATENT DOCUMENTS

| | | | |
|---|---|---|---|
| 2014/0161074 A1* | 6/2014 | Somasundaram | H04L 1/1838 370/329 |
| 2014/0313981 A1* | 10/2014 | Christoffersson | H04L 1/1812 370/328 |
| 2015/0085667 A1* | 3/2015 | Sivanesan | H04W 24/04 370/237 |
| 2016/0183158 A1* | 6/2016 | Decarreau | H04W 36/02 370/328 |

OTHER PUBLICATIONS

Written Opinion of the International Searching Authority issued in PCT/JP2015/056474 dated May 26, 2015 (3 pages).

3GPP TR 36.842 V12.0.0; "3rd Generation Partnership Project; Technical Specification Group Radio Access Network; Study on Small Cell enhancements for E-UTRA and E-UTRAN; Higher layer aspects (Release 12)"; Dec. 2013 (74 pages).

* cited by examiner

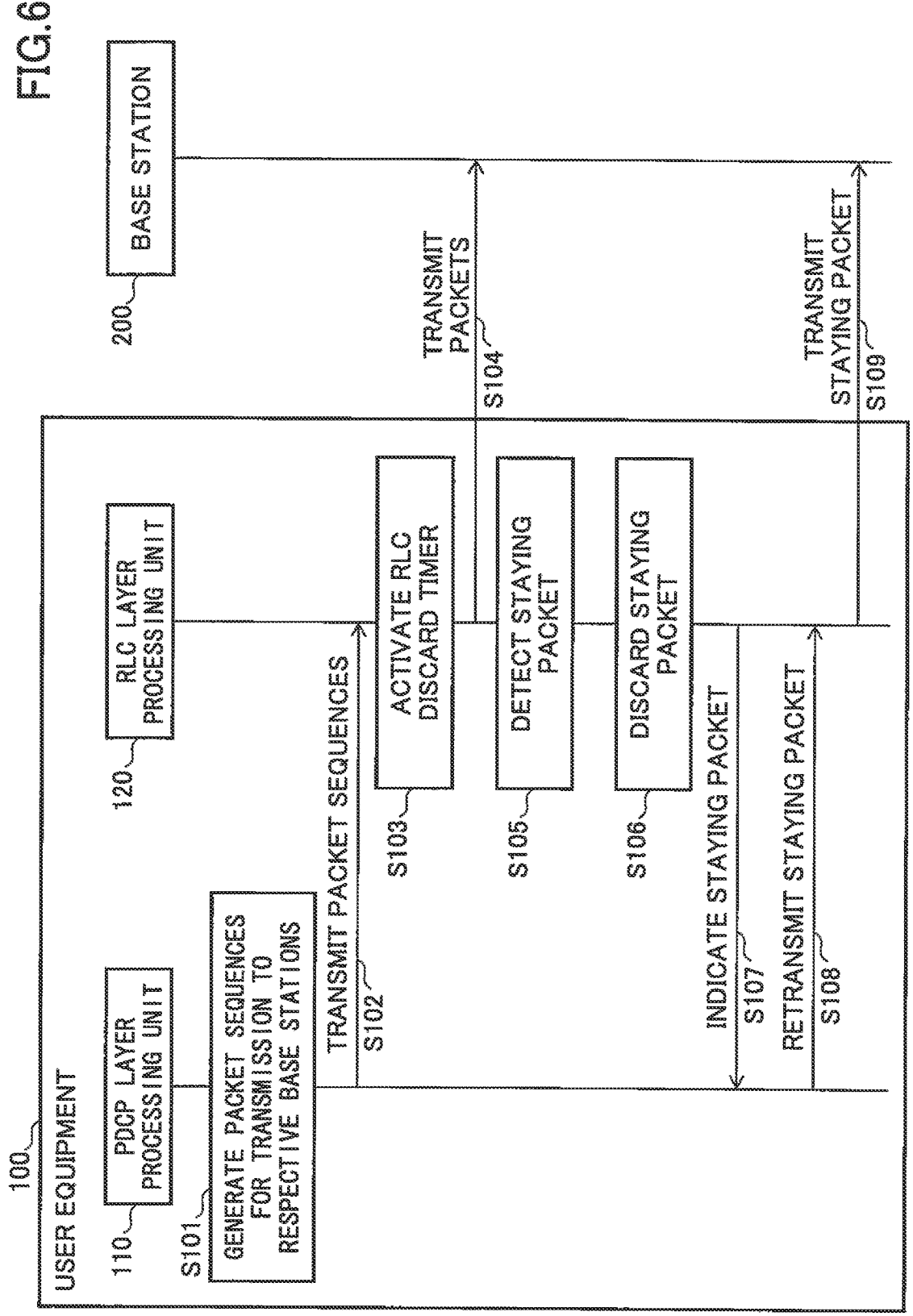

USER EQUIPMENT AND UPLINK DATA TRANSMISSION METHOD

BACKGROUND

Technical Field

The present invention relates to a radio communication system.

Background Art

Presently, as next-generation communication standards of LTE (Long Term Evolution), 3GPP (3$^{rd}$ Generation Partnership Project) is developing specifications designed to sophisticate LTE-Advanced. In LTE-Advanced systems, carrier aggregation (CA) technique is introduced to achieve a higher throughput than that of LTE systems while ensuring backward compatibility with the LTE systems. In the carrier aggregation, a component carrier (CC) having the maximum bandwidth of 20 MHz supported by the LTE systems is used as a basic component, and it is designed to achieve communication in a broader band by using these multiple component carriers simultaneously.

In the carrier aggregation, user equipment (UE) can use multiple carrier components simultaneously to communicate with a base station (evolved NodeB: eNB). In the carrier aggregation, a highly reliable primary cell (PCell) to ensure connectivity to the user equipment and a secondary cell (SCell) additionally configured for the user equipment in connection with the primary cell are configured.

The primary cell is similar to a serving cell in the LTE systems and serves as a cell to ensure connectivity between the user equipment and a network. On the other hand, the secondary cell is a cell configured for the user equipment additionally to the primary cell. Addition and deletion of the secondary cell are performed with a RRC (Radio Resource Control) configuration.

In the carrier aggregation up to LTE Release 10 (Rel-10), as illustrated in the left side in FIG. 1, it is defined that user equipment uses multiple component carriers served from a single base station to conduct simultaneous communication. Meanwhile, in Rel-12, the carrier aggregation in Rel-10 is further extended, and as illustrated in the right side in FIG. 1, dual connectivity where the user equipment uses multiple component carriers served from multiple base stations to conduct the simultaneous communication is discussed. For example, if all component carriers cannot be accommodated in a single base station, it is considered that the dual connectivity can be effectively utilized to achieve a throughput nearly equal to that in Rel-10.

In the dual connectivity, as illustrated in FIG. 2, bearer splitting where user equipment (UE) splits a single EPS (Evolved Packet System) bearer or packet sequence in a predefined manner and uses component carriers served from multiple base stations (eNB#1, eNB#2) to transmit the respective split packet sequences simultaneously is discussed. Specifically, as illustrated, the user equipment splits the to-be-transmitted EPS bearer into packet sequences destined for eNB#1 and eNB#2 in a certain ratio (eNB#1: eNB#2=4:3 in the illustrated example) and transmits the respective split packet sequences to the base stations eNB#1 and eNB#2 via component carriers CC#1 and CC#2, respectively. Upon receiving the split packet sequence via CC#2, the base station eNB#2 serving as a non-anchor node forwards the received packet sequence to the anchor base station eNB#1. Upon receiving the packet sequence forwarded from eNB#2, eNB#1 reorders the packet sequence received via CC#1 and the packet sequence received from eNB#2 to reconstruct the packet sequence from the user equipment and forwards the reconstructed packet sequence to a core node (CN).

PRIOR ART DOCUMENT

Non-Patent Document

Non-Patent Document 1: 3GPP TR36.842 "Study on Small Cell enhancements for E-UTRA and E-UTRAN; Higher Layer aspects"

SUMMARY OF INVENTION

For a packet distribution manner to implement the bearer splitting of uplink data, a method for setting a ratio for distributing data amounts of the uplink data over respective component carriers or cell groups (CGs) (eNB#1: eNB#2=4:3 in the example in FIG. 2) in a semi-static manner has been proposed.

However, if the data amount ratio is not properly set in accordance with the proposed semi-static data amount ratio setting method, there is a likelihood that an uplink throughput cannot be improved. For example, if a throughput sufficient to transmit distributed data cannot be implemented in a certain cell due to degraded communication quality, the data distributed to the cell would be accumulated in a transmission buffer for storing to-be-transmitted uplink data.

One or more embodiments of the present invention provide techniques for transmitting uplink data in the dual connectivity efficiently.

According to one or more embodiments of the invention user equipment has a dual connectivity function to communicate with multiple base stations simultaneously, comprising: a PDCP (Packet Data Convergence Protocol) layer processing unit configured to generate packet sequences for transmission to respective ones of the multiple base stations from to-be-transmitted uplink data; and a RLC (Radio Link Control) layer processing unit configured to transmit the generated packet sequences to the multiple base stations, wherein the RLC layer processing unit includes: a RLC buffer configured to store packets transmitted from the PDCP layer processing unit and destined for the respective ones of the multiple base stations; RLC entities provided corresponding to respective ones of the multiple base stations, the RLC entities being configured to transmit the packets stored in the RLC buffer to the corresponding base stations; and a RLC entity control unit configured to control the RLC buffer and the RLC entities, wherein the RLC entity control unit has a RLC discard timer configured to count a staying time of the respective packets stored in the RLC buffer, the RLC entity control unit discards a staying packet, for which the RLC discard timer has expired, from the RLC buffer, indicates the PDCP layer processing unit to retransmit the staying packet to the RLC buffer as a packet destined for a different base station, and transmits the staying packet retransmitted from the PDCP layer processing unit from a RLC entity corresponding to the different base station.

Another aspect of the present invention relates to an uplink data transmission method for use in user equipment having a dual connectivity function to communicate with multiple base stations simultaneously, the method comprising: generating, by a PDCP (Packet Data Convergence Protocol) layer processing unit, packet sequences for transmission to respective ones of the multiple base stations from to-be-transmitted uplink data and transmitting the generated packet sequences to a RLC (Radio Link Control) layer processing unit; upon storing respective packets of the packet sequences in a RLC buffer, activating, by the RLC layer processing unit, a RLC discard timer to count a staying time of the packets; detecting, by the RLC layer processing unit, a staying packet, for which the RLC discard timer has expired, in the RLC buffer; discarding, by the RLC layer processing unit, the staying packet from the RLC buffer and indicating the PDCP layer processing unit to retransmit the staying packet to the RLC buffer as a packet destined for a different base station; retransmitting, by the PDCP layer processing unit, the indicated staying packet to the RLC buffer as the packet destined for the different base station; and transmitting, by the RLC layer processing unit, the retransmitted staying packet to the different base station.

According to the present invention, some techniques for transmitting uplink data in the dual connectivity efficiently can be provided.

BRIEF DESCRIPTION OF DRAWINGS

FIG. 6 is a sequence diagram for illustrating an uplink data transmission operation according to one or more embodiments of the present invention.

DETAILED DESCRIPTION OF EMBODIMENTS

Embodiments of the present invention are described below with reference to the drawings.

User equipment having a dual connectivity function to communicate with multiple base stations simultaneously is disclosed. Summarizing embodiments as stated below, a PDCP layer processing unit in the user equipment generates packet sequences for transmission to respective base stations from to-be-transmitted uplink data and transmits the generated packet sequences to a RLC layer processing unit. When the respective packets provided from the PDCP layer processing unit are stored in a RLC buffer, the RLC layer processing unit in the user equipment activates a RLC discard timer for counting a staying time of the respective packets. Then, while the RLC layer processing unit transmits the respective packets stored in the RLC buffer to destination base stations of the packets, upon detecting a packet that has been accumulated in the RLC buffer longer than or equal to a predefined time due to transmission latency arising between the user equipment and a base station and results in expiration of the RLC discard timer, the RLC layer processing unit discards the detected staying packet from the RLC buffer and attempts to transmit the staying packet to another base station. To this end, the RLC layer processing unit indicates the PDCP layer processing unit to retransmit the staying packet as a packet destined for another base station. Upon receiving this indication, the PDCP layer processing unit retransmits the indicated staying packet as the packet destined for another base station, and the RLC layer processing unit transmits the retransmitted staying packet to another base station.

In this manner, even if latency arises in communication with any base station in a method for setting a ratio for distributing to-be-transmitted packets over multiple base stations in a semi-static manner, the packet for which transmission latency longer than or equal to the predefine time has arisen can be rapidly transmitted via another base station.

Here, the packet may be autonomously discarded in the RLC layer at expiration of the RLC discard timer or may be discarded in accordance with an instruction from the PDCP layer after transmitting an indication to the PDCP layer.

Figure 1:
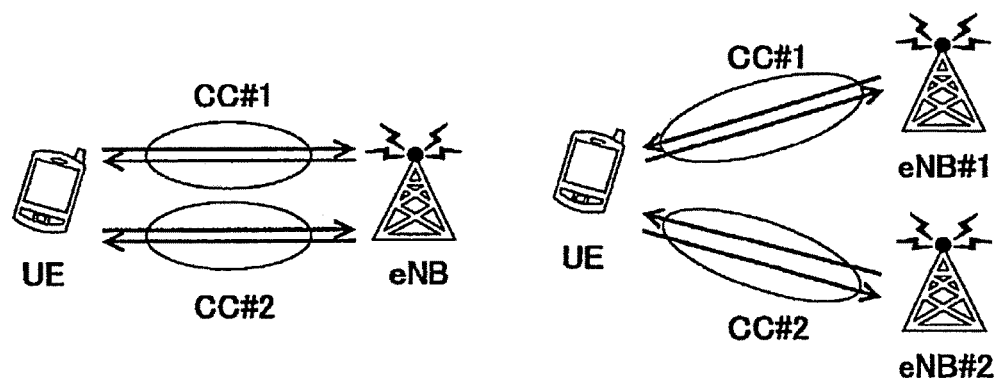
FIG. 1 is a schematic view for illustrating carrier aggregation.
Figure 2:
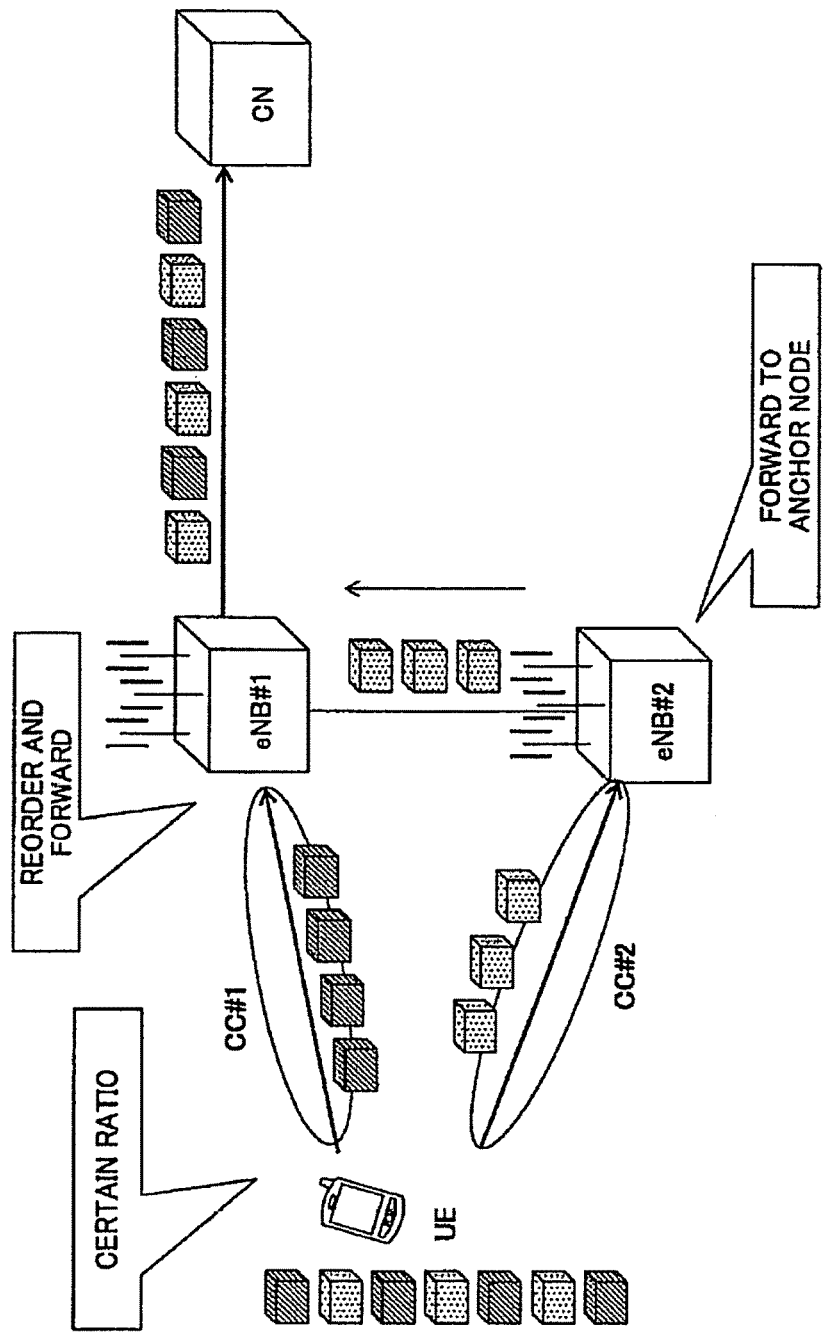
FIG. 2 is a schematic view for illustrating bearer splitting in dual connectivity.
Figure 3:
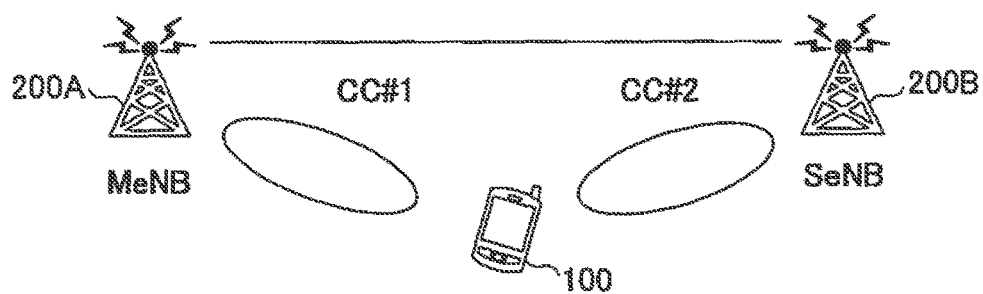
FIG. 3 is a schematic view for illustrating a radio communication system according to one or more embodiments of the present invention.

A radio communication system according to one or more embodiments of the present invention is described with reference to FIG. 3. FIG. 3 is a schematic view for illustrating a radio communication system according to one or more embodiments of the present invention.

As illustrated in FIG. 3, a radio communication system 10 has user equipment 100 and base stations 200A, 200B. The radio communication system 10 supports dual connectivity where the user equipment 100 uses component carriers CC#1, CC#2 served from the multiple base stations 200A, 200B to conduct simultaneous communication, and as illustrated, the user equipment 100 uses a dual connectivity function to communicate with the master base station (MeNB) 200A and the secondary base station (SeNB) 200B. In the illustrated embodiment, only the two base stations 200A, 200B are illustrated, but a large number of base stations 200 are generally disposed to cover a service area of the radio communication system 10.

The user equipment 100 has the dual connectivity function to communicate with the multiple base stations 200A, 200B simultaneously. Typically, as illustrated, the user equipment 100 may be any appropriate information processing device with a radio communication function such as a smartphone, a mobile phone, a tablet and a mobile router. The user equipment 100 is arranged from a CPU (Central Processing Unit) such as a processor, a memory device such as a RAM (Random Access Memory) and a flash memory, a radio communication device for transmitting and receiving radio signals to/from the base stations 200A, 200B and so on. For example, functions and operations of the user equipment 100 as stated below may be implemented by the CPU running data and program stored in the memory device. However, the user equipment 100 is not limited to the above-stated hardware configuration and may be arranged from circuits for implementing one or more of operations as stated below.

The base stations 200A, 200B (which may be collectively referred to as the base stations 200 hereinafter) establish a radio connection to the user equipment 100 to transmit downlink (DL) packets received from network devices, such as an upper station and a server, communicatively connected on a core network (not shown) to the user equipment 100 as well as transmit uplink (UL) packets received from the user equipment 100 to the network devices. In the illustrated embodiment, the base station 200A serves as a master base station (MeNB) or a primary base station, and the base station 200B serves as a secondary base station (SeNB). In the dual connectivity, the master base station 200A controls simultaneous communication between the user equipment 100 and the base stations 200A, 200B in accordance with the dual connectivity and controls communication with the upper core network (not shown).

In the dual connectivity, the master base station 200A configures the secondary cell CC#2 served from the secondary base station 200B for the user equipment 100 and forwards uplink data received via the primary cell CC#1 and the secondary cell CC#2 to the core network. Specifically, the user equipment 100 splits the uplink data into two packet sequences in accordance with a predefined splitting manner and transmits the respective split packet sequences to the master base station 200A and the secondary base station 200B via CC#1 and CC#2, respectively. Upon receiving the split packet sequence from the user equipment 100, the secondary base station 200B forwards the received packet sequence to the master base station 200A. Upon receiving the forwarded packet sequence, the master base station 200A reorders the packets received from the secondary base station 200B and the packets received from the user equipment 100 via CC#1 to reconstruct the packet sequence and forwards the reconstructed packet sequence to the core network.

Figure 4:
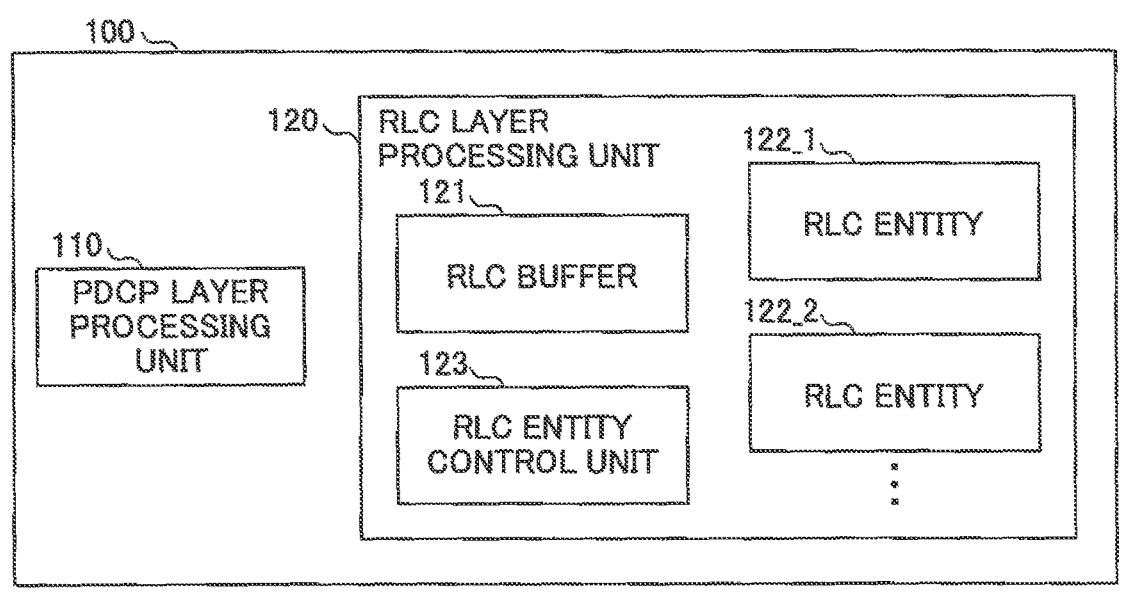
FIG. 4 is a block diagram for illustrating an arrangement of user equipment according to one or more embodiments of the present invention.

Next, the user equipment according to one or more embodiments of the present invention is described with reference to FIG. 4. FIG. 4 is a block diagram for illustrating an arrangement of the user equipment according to one or more embodiments of the present invention.

As illustrated in FIG. 4, the user equipment 100 has a PDCP layer processing unit 110 and a RLC layer processing unit 120. Also, the RLC layer processing unit 120 has a RLC buffer 121, RLC entities 122_1, 122_2, . . . provided corresponding to respective ones of multiple base stations 200 (which may be collectively referred to as RLC entities 122 hereinafter) and a RLC entity control unit 123.

The PDCP layer processing unit 110 generates packet sequences for transmission to respective ones of the multiple base stations 200A, 200B from to-be-transmitted uplink data. Specifically, as illustrated in the upper-left illustration in FIG. 5, the PDCP layer processing unit 110 receives to-be-transmitted PDCP SDUs (Service Data Units) from an upper layer and converts the received PDCP SDUs into PDCP PDUs (Protocol Data Units). The PDCP layer processing unit 110 transmits the generated PDCP PDUs to the RLC layer processing unit 120 as packets destined for the master base station (MeNB) 200A and packets destined for the secondary base station (SeNB) 200B in accordance with a predefined splitting manner.

In one embodiment, the PDCP layer processing unit 110 may receive a splitting ratio for splitting transmission (bearer splitting) of the to-be-transmitted uplink data to the multiple base stations 200 and generate the packet sequences for transmission to the respective base stations 200 in accordance with the received splitting ratio. For example, the splitting ratio may be indicated from the master base station 200A. As illustrated in the upper-left illustration in FIG. 5, the splitting ratio may be set as "master base station 200A: secondary base station 200B=1:1", for example. In this case, the PDCP layer processing unit 110 may transmit PDCP PDUs having odd sequence numbers (SNs) as the packets destined for the master base station 200A and PDCP PDUs having even sequence numbers (SNs) as the packet destined for the secondary base station 200B to the RLC layer processing unit 120. However, the present invention is not limited to it, and any other appropriate splitting ratio may be applied.

Also, the PDCP layer processing unit 110 may have a PDCP discard timer (PDCP Discard Timer) to discard packets stored in the PDCP layer processing unit 110. The PDCP layer processing unit 110 stores already transmitted PDCP PDUs in a buffer (not shown) for subsequent retransmission for a predefined time after transmitting the PDCP PDUs to the RLC layer processing unit 120. When the PDCP discard timer configured for the respective PDCP PDUs has expired due to passage of the predefined time, the PDCP layer processing unit 110 may discard the PDCP PDUs.

The RLC layer processing unit 120 transmits the packet sequences generated by the PDCP layer processing unit 110 to the multiple base stations 200. In one embodiment, the RLC layer processing unit 120 has a RLC buffer 121 to store packets transmitted from the PDCP layer processing unit 110 and destined for respective ones of the multiple base stations 200, RLC entities 122_1, 122_2, . . . (which may be collectively referred to as RLC entities 122) provided corresponding to the respective ones of the multiple base stations 200 to transmit the packets stored in the RLC buffer 121 to the corresponding base stations 200, and a RLC entity control unit 123 to control the RLC buffer 121 and the RLC entities 122.

For example, the RLC layer processing unit 120 receives PDCP PDUs from the PDCP layer processing unit 110 and stores the received PDCP PDUs in the RLC buffer 121. As illustrated in the upper-left illustration in FIG. 5, when radio resources or transport blocks (TBs) are assigned by the corresponding base stations 200A, 200B for transmission, the RLC entity 122_1 (RLC(MeNB)) corresponding to the master base station 200A and the RLC entity 122_2 (RLC(SeNB)) corresponding to the secondary base station 200B extract PDCP PDUs destined for the corresponding base stations from the RLC buffer 121. Then, the RLC entities 122_1, 122_2 convert the extracted PDCP PDUs into RLC PDUs and map the generated RLC PDUs into the assigned radio resources or transport blocks to transmit to the corresponding base stations 200A, 200B, respectively.

Figure 5:
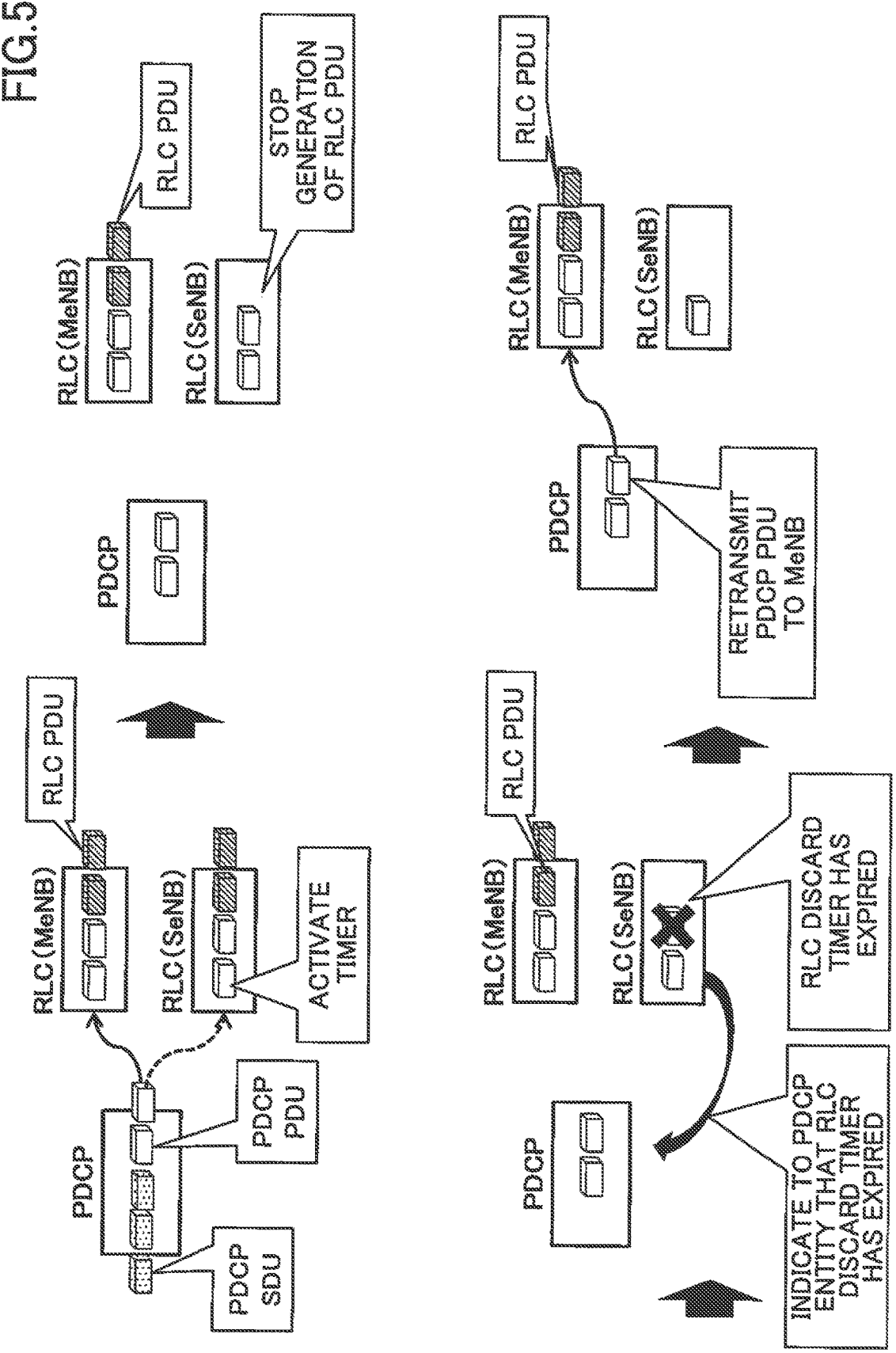
FIG. 5 is a schematic view for illustrating an uplink data transmission operation according to one or more embodiments of the present invention.

Meanwhile, if packet transmission from the RLC entities 122 to the base stations 200 is delayed due to degraded communication quality or others, as illustrated in the upper-right illustration in FIG. 5, assignment of the radio resources or transport blocks by the RLC entities 122 for transmission to the corresponding base stations 200 would be delayed or stopped, which may also delay or stop generation of RLC PDUs in the RLC entities 122. If the generation of RLC PDUs is delayed or stopped, stored PDCP PDUs destined for the base station would be accumulated in the RLC buffer 121. As a result, even if the RLC layer processing unit 120 receives the PDCP PDUs destined for the base station from the PDCP layer processing unit 110, the received PDCP PDUs would not be transmitted to the base station 200 but be accumulated in the RLC buffer 121, which may cause not only transmission latency of to-be-transmitted uplink data but also overflow of the RLC buffer 121.

In order to manage the staying time of packets in the RLC buffer 121, the RLC entity control unit 123 has a RLC discard timer (RLC Discard Timer) to count the staying time of respective packets in packet sequences stored in the RLC buffer 121. In order to avoid the transmission latency and the overflow as stated above, the RLC entity control unit 123 discards a staying packet, for which the RLC discard timer has expired, from the RLC buffer 121, indicates the PDCP layer processing unit 110 to retransmit the staying packet to the RLC buffer 121 as a packet destined for a different base station, and transmits the staying packet retransmitted from the PDCP layer processing unit 110 from a RLC entity 122 corresponding to the different base station. For example, as illustrated in the lower-left illustration in FIG. 5, when the RLC discard timer has expired for a packet in the RLC buffer 121 destined for the secondary base station 200B, the RLC entity control unit 123 indicates the PDCP layer processing unit 110 to discard the packet from the RLC buffer 121 and retransmit the staying packet as a packet destined for the master base station 200A to transmit from the master base station 200A. Upon receiving the retransmission indication, the PDCP layer processing unit 110 transmits the indicated PDCP PDU to the RLC layer processing unit 120 as the packet destined for the master base station 200A, and the RLC entity 122_1 transmits the retransmitted PDCP PDU to the master base station 200A. In this manner, the RLC layer processing unit 120 transmits packets, whose transmission to a certain base station 200 is delayed due to degraded communication condition or others, via another base station 200, which can effectively reduce transmission latency of uplink data. In one embodiment, the RLC entity 122_1 corresponding to the master base station 200A may preferentially transmit packets retransmitted from the PDCP layer processing unit 110. As a result, the master base station 200A can promptly receive the staying packets that have not been forwarded from the secondary base station 200B and shortly restart reordering that has been delayed due to waiting for the missing staying packets. Although transmission latency arises in the secondary base station 200B in the example illustrated in FIG. 5, the present invention is not limited to it and can be analogously applied to the case where the transmission latency arises in the master base station 200A.

In one embodiment, the RLC entity control unit 123 may activate the RLC discard timer in response to respective packets being stored in the RLC buffer 121 and stop the RLC discard timer in response to at least a portion of the packets being transmitted. Specifically, when at least a portion of RLC PDUs is mapped into transport blocks for transmission, the RLC entity control unit 123 may stop the RLC discard timer.

Also, in one embodiment, the RLC entity control unit 123 may set an expiration time for the RLC discard timer depending on a bearer type or a logical channel type of packets. For example, the expiration time of the RLC discard timer may be set to a relatively short time for a bearer type or a logical channel where long transmission latency is unacceptable. On the other hand, the expiration time of the RLC discard timer may be set to a relatively long time for a bearer type or a logical channel where a certain amount of latency is acceptable. Also, in another embodiment, the RLC entity control unit 123 may set the expiration time for the RLC discard timer with a time indicated from the multiple base stations 200 in RRC. For example, the expiration time of the RLC discard timer may be indicated in a RRC message from the master base station 200A. Here, the RLC entity control unit 123 may stop the RLC discard timer corresponding to a packet for which the PDCP discard timer has expired. In other words, the packet for which the PDCP discard timer has expired is discarded in the PDCP layer processing unit 110. As a result, even if the RLC entity control unit 123 continues counting the RLC discard timer, the RLC entity control unit 123 cannot cause the PDCP layer processing unit 110 to retransmit the staying packet and accordingly may stop the RLC discard timer so as to avoid unnecessarily counting the RLC discard timer.

In one embodiment, if three or more base stations are configured for the user equipment 100 in dual connectivity, the PDCP layer processing unit 110 may select which base station to transmit the staying packet in accordance with predefined selection criteria including any of descending order or ascending order of indices of these base stations 200, descending order or ascending order of indices of cell groups configured by the base stations 200, and communication quality or an average throughput of communication between the respective base stations 200 and the user equipment 100.

Also, in one embodiment, the RLC layer processing unit 120 may discard the staying packet from the RLC buffer 121 and upon receiving a staying packet retransmitted from the PDCP layer processing unit 110, indicate a BSR (Buffer Status Report) to the multiple base stations 200 to indicate that accumulated data amounts in the respective RLC entities 122 have changed.

Here, in the above-stated embodiments, the single RLC buffer 121 is shared among the RLC entities 122, but the present invention is not limited to it. For example, the respective RLC entities 122 may have their own RLC buffers 121. In this case, packets destined for the base stations 200 corresponding to the RLC entities 122 would be stored in the respective RLC buffers 121.

Next, uplink data transmission operations for use in the user equipment according to one or more embodiments of the present invention are described with reference to FIG. 6. FIG. 6 is a sequence diagram for illustrating an uplink data transmission operation in the user equipment according to one or more embodiments of the present invention.

As illustrated in FIG. 6, at step S101, the PDCP layer processing unit 110 generates packet sequences for transmission to respective ones of multiple base stations 200 from to-be-transmitted uplink data. In one embodiment, the PDCP layer processing unit 110 receives to-be-transmitted PDCP SDUs from an upper layer and converts the received PDCP SDUs into PDCP PDUs.

At step S102, the PDCP layer processing unit 110 transmits the generated packet sequences to the RLC layer processing unit 120. In one embodiment, the PDCP layer processing unit 110 transmits the PDCP PDUs to the RLC layer processing unit 120 as packets destined for the master base station 200A or the secondary base station 200B in accordance with a predefined splitting manner such as a predefined splitting ratio based splitting manner (bearer splitting). For example, the splitting ratio may be indicated from the master base station 200A.

At step S103, upon storing respective packets of the packet sequences received at step S102 in the RLC buffer 121, the RLC layer processing unit 120 activates the RLC discard timer (RLC Discard Timer) to count a staying time of the packets.

At step S104, the RLC layer processing unit 120 transmits the packets stored in the RLC buffer 121 to the destination base station 200. In one embodiment, when radio resources or transport blocks (TBs) are assigned by the destination base station 200 for transmission, the RLC layer processing unit 120 extracts PDCP PDUs destined for the base station 200 from the RLC buffer 121 and converts the extracted PDCP PDUs into RLC PDUs. Then, the RLC layer processing unit 120 maps the generated RLC PDUs into the assigned radio resources or transport blocks to transmit to the base station 200.

At step S105, the RLC layer processing unit 120 detects a staying packet, for which the RLC discard timer has expired, in the RLC buffer 121. For example, if packet transmission from the RLC layer processing unit 120 to the base station 200 is delayed due to degraded communication quality, assignment of radio resources or transport blocks by the base station 200 for transmission is delayed in the RLC layer processing unit 120, which would delay or stop generation of RLC PDUs. At a result, the stored PDCP PDUs would be accumulated in the RLC buffer 121, which may cause transmission latency of uplink data. In order to manage such transmission latency, the RLC layer processing unit 120 uses the RLC discard timer to detect PDCP PDUs that have been accumulated in a predefined time.

At step S106, the RLC layer processing unit 120 discards the staying packet from the RLC buffer 121. In one embodiment, the RLC layer processing unit 120 determines the PDCP PDUs for which the RLC discard timer has expired as the staying packets and discards the PDCP PDUs from the RLC buffer 121.

At step S107, the RLC layer processing unit 120 indicates the PDCP layer processing unit 110 to retransmit the detected staying packet as a packet destined for a different base station 200. For example, if transmission to the secondary base station 200B is delayed and a staying packet destined for the secondary base station 200B is detected in the RLC buffer 121, the RLC layer processing unit 120 indicates the PDCP layer processing unit 110 to retransmit the staying packet as a packet destined for the master base station 200A to transmit the staying packet via the master base station 200A.

At step S108, the PDCP layer processing unit 110 retransmits the indicated staying packet to the RLC layer processing unit 120 as the packet destined for the different base station 200. In the example as stated above, the PDCP layer processing unit 110 retransmits the staying packet indicated by the RLC layer processing unit 120 as the packet destined for the master base station 200A.

At step S109, the RLC layer processing unit 120 transmits the retransmitted staying packet from the RLC entity 122 corresponding to the different base station 200. In the example as stated above, the RLC layer processing unit 120 transmits the staying packet retransmitted from the PDCP layer processing unit 110 from the RLC entity 122_1 corresponding to the master base station 200A.

Although the embodiments of the present invention have been described in detail, the present invention is not limited to the above-stated specific embodiments, and various modifications and variations can be made within the spirit of the present invention as recited in claims.

This international patent application is based on Japanese Priority Application No. 2014-056820 filed on Mar. 19, 2014, the entire contents of which are hereby incorporated by reference.

LIST OF REFERENCE SYMBOLS

10: radio communication system
100: user equipment
200A, 200B: base station Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. User equipment having a dual connectivity function to communicate with multiple base stations simultaneously, comprising:
   a PDCP (Packet Data Convergence Protocol) layer processing unit configured to generate packet sequences for transmission to respective ones of the multiple base stations from to-be-transmitted uplink data; and
   a RLC (Radio Link Control) layer processing unit configured to transmit the generated packet sequences to the multiple base stations,
   wherein the RLC layer processing unit includes:
      a RLC buffer configured to store packets transmitted from the PDCP layer processing unit and destined for the respective ones of the multiple base stations;
      RLC entities provided corresponding to respective ones of the multiple base stations, the RLC entities being configured to transmit the packets stored in the RLC buffer to the corresponding base stations; and
      a RLC entity control unit configured to control the RLC buffer and the RLC entities,
      wherein the RLC entity control unit has a RLC discard timer configured to count a staying time of the respective packets stored in the RLC buffer,
      the RLC entity control unit discards a staying packet, for which the RLC discard timer has expired, from the RLC buffer, indicates the PDCP layer processing unit to retransmit the staying packet to the RLC buffer as a packet destined for a different base station, and transmits the staying packet retransmitted from the PDCP layer processing unit from a RLC entity corresponding to the different base station.

2. The user equipment as claimed in claim 1, wherein the PDCP layer processing unit receives a splitting ratio for splitting transmission of the to-be-transmitted uplink data to the multiple base stations and generates packet sequences for transmission to respective ones of the multiple base stations in accordance with the splitting ratio.

3. The user equipment as claimed in claim 2, wherein the RLC entity control unit activates the RLC discard timer in response to respective packets being stored in the RLC buffer and stops the RLC discard timer in response to at least a portion of the packets being transmitted.

4. The user equipment as claimed in claim 2, wherein the PDCP layer processing unit has a PDCP discard timer configured to discard packets stored in the PDCP layer processing unit, and the RLC entity control unit stops the RLC discard timer corresponding to a packet for which the PDCP discard timer has expired.

5. The user equipment as claimed in claim 2, wherein the RLC entity control unit sets an expiration time for the RLC discard timer depending on a bearer type or a logical channel type.

6. The user equipment as claimed in claim 2, wherein the RLC entity control unit sets an expiration time for the RLC discard timer with a time indicated from the multiple base stations in RRC (Radio Resource Control).

7. The user equipment as claimed in claim 2, wherein if the multiple base stations include three or more base stations, the PDCP layer processing unit selects which base station to transmit the staying packet in accordance with predefined selection criteria including any of descending order or ascending order of indices of the multiple base stations, descending order or ascending order of indices of cell groups configured by the multiple base stations, and communication quality or an average throughput of communication between the multiple base stations and the user equipment.

8. The user equipment as claimed in claim 2, wherein the RLC entity corresponding to the different base station preferentially transmits the staying packet retransmitted from the PDCP layer processing unit.

9. The user equipment as claimed in claim 2, wherein the RLC layer processing unit discards the staying packet from the RLC buffer and upon receiving the staying packet retransmitted from the PDCP layer processing unit, indicates a BSR (Buffer Status Report) to the multiple base stations, the BSR indicating that accumulated data amounts in the respective RLC entities have changed.

10. The user equipment as claimed in claim 1, wherein the RLC entity control unit activates the RLC discard timer in response to respective packets being stored in the RLC buffer and stops the RLC discard timer in response to at least a portion of the packets being transmitted.

11. The user equipment as claimed in claim 10, wherein the PDCP layer processing unit has a PDCP discard timer configured to discard packets stored in the PDCP layer processing unit, and the RLC entity control unit stops the RLC discard timer corresponding to a packet for which the PDCP discard timer has expired.

12. The user equipment as claimed in claim 10, wherein the RLC entity control unit sets an expiration time for the RLC discard timer depending on a bearer type or a logical channel type.

13. The user equipment as claimed in claim 10, wherein the RLC entity control unit sets an expiration time for the RLC discard timer with a time indicated from the multiple base stations in RRC (Radio Resource Control).

14. The user equipment as claimed in claim 1, wherein the PDCP layer processing unit has a PDCP discard timer configured to discard packets stored in the PDCP layer processing unit, and the RLC entity control unit stops the RLC discard timer corresponding to a packet for which the PDCP discard timer has expired.

15. The user equipment as claimed in claim 1, wherein the RLC entity control unit sets an expiration time for the RLC discard timer depending on a bearer type or a logical channel type.

16. The user equipment as claimed in claim 1, wherein the RLC entity control unit sets an expiration time for the RLC discard timer with a time indicated from the multiple base stations in RRC (Radio Resource Control).

17. The user equipment as claimed in claim 1, wherein if the multiple base stations include three or more base stations, the PDCP layer processing unit selects which base station to transmit the staying packet in accordance with predefined selection criteria including any of descending order or ascending order of indices of the multiple base stations, descending order or ascending order of indices of cell groups configured by the multiple base stations, and communication quality or an average throughput of communication between the multiple base stations and the user equipment.

18. The user equipment as claimed in claim 1, wherein the RLC entity corresponding to the different base station preferentially transmits the staying packet retransmitted from the PDCP layer processing unit.

19. The user equipment as claimed in claim 1, wherein the RLC layer processing unit discards the staying packet from the RLC buffer and upon receiving the staying packet retransmitted from the PDCP layer processing unit, indicates a BSR (Buffer Status Report) to the multiple base stations, the BSR indicating that accumulated data amounts in the respective RLC entities have changed.

20. An uplink data transmission method for use in user equipment having a dual connectivity function to communicate with multiple base stations simultaneously, the method comprising:
- generating, by a PDCP (Packet Data Convergence Protocol) layer processing unit, packet sequences for transmission to respective ones of the multiple base stations from to-be-transmitted uplink data and transmitting the generated packet sequences to a RLC (Radio Link Control) layer processing unit;
- upon storing respective packets of the packet sequences in a RLC buffer, activating, by the RLC layer processing unit, a RLC discard timer to count a staying time of the packets;
- detecting, by the RLC layer processing unit, a staying packet, for which the RLC discard timer has expired, in the RLC buffer;
- discarding, by the RLC layer processing unit, the staying packet from the RLC buffer and indicating the PDCP layer processing unit to retransmit the staying packet to the RLC buffer as a packet destined for a different base station;
- retransmitting, by the PDCP layer processing unit, the indicated staying packet to the RLC buffer as the packet destined for the different base station; and
- transmitting, by the RLC layer processing unit, the retransmitted staying packet to the different base station.

* * * * *